US005753871A

United States Patent [19]
Kahara et al.

[11] Patent Number: 5,753,871
[45] Date of Patent: May 19, 1998

[54] SAG RESISTANT, CAST ACOUSTICAL CEILING TILE AND METHOD FOR MAKING THE SAME

[75] Inventors: Bruce J. Kahara, Woodstock, Ill.; David B. Bitzan, Elkhorn, Wis.

[73] Assignee: USG Interiors, Inc., Chicago, Ill.

[21] Appl. No.: 685,332

[22] Filed: Jul. 23, 1996

[51] Int. Cl.$^6$ ...................................................... E04B 1/82
[52] U.S. Cl. ............................................ 181/290; 181/294
[58] Field of Search .................................. 181/284, 290, 181/291, 294, 286, 295

[56] References Cited

U.S. PATENT DOCUMENTS

| | | | |
|---|---|---|---|
| 2,416,447 | 2/1947 | Laughlin et al. | 162/159 |
| 3,183,996 | 5/1965 | Capaul | 181/291 |
| 3,202,567 | 8/1965 | Muri et al. | 428/460 |
| 3,616,144 | 10/1971 | Kenney | 156/41 |
| 4,010,817 | 3/1977 | Warren et al. | 181/284 |

*Primary Examiner*—Khanh Dang
*Attorney, Agent, or Firm*—John M. Lorenzen

[57] ABSTRACT

A sag resistant, cast acoustical ceiling tile which has a mineral wool core and a starch binder and which has a formaldehyde resin impregnated paper backing. A kraft paper backing which has been impregnated with a melamine formaldehyde resin has been found particularly effective in providing sag resistance in high temperature, high humidity conditions such as encountered in Pacific Rim countries. A method has been developed to manufacture the sag resistant, cast acoustical ceiling tile wherein water is applied to the paper backing prior to machining and painting to provide a tile which has a relatively flat initial plane position.

7 Claims, No Drawings

SAG RESISTANT, CAST ACOUSTICAL CEILING TILE AND METHOD FOR MAKING THE SAME

FIELD OF THE INVENTION

This invention relates to cast, acoustical ceiling tiles and panels. More particularly, this invention relates to cast, acoustical ceiling tiles which are sag resistant, especially in high temperature, high humidity conditions. These high humidity conditions are frequently encountered in Pacific Rim countries. The invention also relates to the method for making the sag resistant, acoustical tiles.

BACKGROUND OF THE INVENTION

A commercially successful, cast acoustical ceiling tile is marketed under the trademark ACOUSTONE and is made generally using the composition and procedures disclosed in U.S. Pat. No. 1,769,519. According to the disclosure in this patent, a molding composition comprising granulated mineral wool fibers, fillers, colorants and a binder, specifically a starch gel, is prepared for molding or casting the body of the tile. The dough-like composition is placed upon suitable trays which have been covered with paper and/or a metallic foil and then the composition is screeded to a specified thickness with a screed bar or roller. A decorative surface, such as elongated fissures, may be provided by the screed bar or roller. The trays filled with the mineral wool composition are then placed in an oven to dry or cure the composition. The dried sheets are removed from the trays with the foil and/or paper backing attached thereto and treated on the face to provide a smooth surface, to obtain the desired thickness and to prevent warping. The sheets are then cut into tiles of a desired size.

The cast acoustical tiles of the prior art, as disclosed in U.S. Pat. Nos. 3,246,063 and 3,307,651, generally use a starch gel as a binder for the mineral wool fibers. The gel may comprise a thick boiling starch composition combined with calcined gypsum (calcium sulfate hemihydrate) which are added to water and cooked at 180° F. (about 80° C.) to about 195° F. (about 90° C.) for several minutes to form the starch gel. Thereafter, the granulated mineral wool is mixed into the starch gel to form the dough-like composition which is used to fill the trays.

Mineral wool acoustical tiles are very porous which is necessary to provide good sound absorption. The prior art (U.S. Pat. Nos. 3,498,404; 5,013,405; 5,047,120 and 5,395,438) also discloses that mineral fillers, such as expanded perlite, may be incorporated into the composition to improve sound absorbing properties and provide light weight.

It is an object of this invention to provide an acoustical ceiling tile having improved sag resistance.

It is another object of this invention to provide a cast acoustical tile having a starch binder with improved sag resistance in high temperature, high humidity conditions.

It is a further object of this invention to provide improved sag resistance for a cast acoustical ceiling tile employing a standard mineral wool formulation.

It is a still further object of this invention to provide a method for making sag resistant, cast acoustical tiles which are relatively flat when initially installed in a flat plane position in a ceiling grid.

These and other objects will be apparent to persons skilled in the art in view of the description which follows.

SUMMARY OF THE INVENTION

It has been discovered that a cast acoustical ceiling tile having improved sag resistance in high temperature, high humidity conditions can be provided by using a formaldehyde resin impregnated paper backing. In particular, a kraft paper backing which has been impregnated with a melamine formaldehyde resin has been found effective in providing sag resistance for a standard cast mineral wool formulation employing a starch binder.

A standard manufacturing process for producing cast acoustical ceiling tiles may be used to prepare the sag resistant tiles of this invention. The starch gel binder is prepared by dispersing the starch in water to form a slurry. The starch slurry is heated to a temperature of about 180° F. (about 80° C.) to about 210° F. (about 100° C.) until the starch is fully cooked and the slurry thickens to a viscous gel, usually about 7 minutes. The cooked starch gel is then pumped to a storage tank.

It may be desired to incorporate other ingredients into the starch gel. Cellulosic fibers may be used for reinforcement, and they are generally incorporated into the starch gel prior to cooking. Other ingredients may include boric acid, a wax emulsion, stucco (calcined gypsum), landplaster, clay and/or cull. The following is a typical starch binder gel formulation:

| Ingredient | Weight % |
| --- | --- |
| Starch | 3–6 |
| Stucco and Cull (50/50) | 3–10 |
| Boric Acid | 0.05–1 |
| Water | 80–95 |

The pulp is prepared by mixing the starch binder gel and mineral wool in a pulp mixer for about 3 to 9 minutes. A standard pulp mix may have the following ranges:

| Ingredient | Amount (wt. %) |
| --- | --- |
| Starch Binder Gel | 75–83 |
| Mineral Wool | 17–25 |

It should be noted that broke or cull may be added up to about 30% of the total dry weight formulation.

After thorough mixing of the starch binder gel and the mineral wool to form a dough-like pulp, the pulp is deposited into metal trays to form the tiles. In accordance with this invention, the trays are lined with a formaldehyde resin impregnated paper. The trays, filled with pulp on top of resin impregnated paper, are passed into a drier where temperatures are maintained between about 260° F. (about 125° C.) and about 350° F. (about 175° C.). During the drying process, the resin impregnated kraft paper will bond to the back of the tile.

The dried tiles may be sanded to the desired thickness and cut to size. In addition, the surface of the tiles may be treated by routing or abrasion to form a decorative surface. If desired, one or two coats of paint may be applied to the surface of the tiles, in which case they are oven-dried before packaging. It has been found that after the ceiling tiles are painted, they undergo substantial "cupping" when they are dried in the oven. As a result, the acoustical ceiling tiles do not lie flat when initially installed in a flat plane position in a ceiling grid, for they extend above the flat plane.

In order to overcome the "cupping" problem, it has been discovered that the application of water to the resin impregnated paper backing prior to machining (i.e. edge cutting) and prior to painting the surface reduces or eliminates the "cupping" condition. The water is applied by spraying a fine mist of water on the paper backed surface. This is done prior to machining and painting in order to provide sufficient time for the paper to absorb the water. This water treatment of the resin impregnated paper backing provides a relatively flat tile after it is painted and dried. The amount of water applied to the resin impregnated paper backing may range from about 1 to about 10 grams per square foot.

In this invention, the key component of the tile is the formaldehyde resin impregnated paper which imparts sag resistance to the tile. Improved sag resistance is an objective of this invention and several concepts were evaluated to achieve this objective. In the manufacture of acoustical ceiling tiles by a water-felting process, a latex binder having a high $T_g$ has been used to provide sag resistance, but in the cast process, excessive amounts of the latex binder in the core of the tile required to provide the desired sag resistance was not cost effective and adversely affected the flame spread rating. Another procedure used in water-felted tiles is backcoating the back surface of the tile with a resin binder. Cast acoustical tiles were spray coated with a melamine formaldehyde cross-linked resin, but it did not provide the desired sag resistance.

An organo-functional silane was incorporated into the core of cast tiles. The silane (SITREN 262) did impart water resistance to the cast ceiling tile, but it did not provide the desired sag resistance.

It has been discovered that formaldehyde resin impregnated paper backing on the cast acoustical ceiling tiles provides substantially improved sag resistance at high temperature, high humidity conditions. Though different types (bleached or unbleached) and basis weights of paper may be used, it is generally preferred to use a kraft paper having a basis weight ranging from about 25 to about 50 pounds, i.e. 25–50 lbs. per 3,000 square feet (a ream). It is also generally preferred that the formaldehyde resin be impregnated into the paper at a range between about 30% and about 50%, with a resin content of about 36–40% by weight in a 40 lb. basis weight kraft paper having been found to be particularly effective in providing the desired sag resistance. It is possible that using a heavier paper may enable one to use less resin in achieving the desired sag resistance.

Whereas several types of formaldehyde resin may be effective as the impregnating agent, a melamine formaldehyde resin is preferred. It is a clear liquid and does not discolor the kraft paper or bleed into the core formulation. It is readily available in commercial quantities at reasonable cost. Other formaldehyde resins which could be used include urea and phenolic formaldehyde resins. It should be noted that the formaldehyde resin is cured to a "B" stage after it is impregnated into the paper, and during the curing a substantial amount of moisture is removed from the paper. The residual moisture in the paper after curing the formaldehyde resin to the "B" stage is referred to as "volatiles" and may range from about 8% to about 12% by weight of the impregnated paper. This residual moisture helps to provide the impregnated paper with flexibility during the manufacture of the ceiling tile. The final curing of the formaldehyde resin occurs when the impregnated paper is placed in the hot trays, and the trays filled with pulp on top of the resin impregnated paper are passed into the drier. It is preferred to use a paper which has been pre-impregnated with the formaldehyde resin by immersion of the paper in the resin. It is also possible to coat the paper with resin by roll coating or spraying.

In the specific examples which follow, the cast acoustical ceiling tiles having a melamine formaldehyde resin impregnated kraft paper backing were tested for sag resistance while undergoing a 3 cycle sag test. Each cycle comprises the following steps:

Step 1: Place a 2 foot×2 foot tile sample in a rack supported around its perimeter similar to the tile being placed in a ceiling grid opening.

Step 2: Place the rack and the installed tile in a room with pre-set conditions of 70° F./50% RH (relative humidity) for a 24 hour period. This simulates standard ambient conditions.

Step 3: Measure the sag or deflection from the perimeter to the center of the tile.

Step 4: Place the rack and the tile in a room pre-conditioned to 90° F./90% RH or 104° F./90% RH for a 24 hour period. This simulates hot, humid (summer) conditions.

Step 5: Measure the sag or deflection.

Step 6: Place the rack and the tile in a room pre-conditioned to 75° F./10% RH for a 24 hour period. This simulates dry (winter) conditions.

Step 7: Measure the sag or deflection.

Step 8: Place the rack and the tile back in the room pre-conditioned to 70° F./50% RH for a 24 hour period.

Step 9: Measure the sag or deflection.

This completes 1 cycle, and steps 2–9 are repeated 2 more times for the prescribed 3 cycle sag testing. The desired parameters are that the initial flat plane position be no more than +/(−) 0.06 inches and that the final position should be less than 0.125 inches from the flat plane after the 3 cycle sag test.

The following operating examples illustrate the improved sag resistance provided by a melamine formaldehyde resin impregnated, saturating grade kraft paper having a 40 lb. basis weight at a resin content of 36–40% in combination with a Class A pulp having the following formulation:

| Ingredient | Amount (lbs) |
|---|---|
| Starch | 325 |
| Stucco | 100 |
| Cull Dust | 100 |
| Boric Acid | 5 |
| Water | 5,600 |
| Mineral Wool | 1,750 |

The melamine formaldehyde resin paper weighed approximately 22.5 pounds/thousand square feet (about 13.3 pounds of paper and 9.2 pounds of resin). Positive numbers indicate a surface extending above the flat plane ("cupping") and negative numbers indicate a surface extending below the flat plane ("sagging").

EXAMPLE 1

30 sample tiles for each of 3 different patterns (FROST, SANDRIFT and GLACIER) of ACOUSTONE cast ceiling tile were tested for their average position relative to the flat plane while undergoing the 3 cycle sag test recited above. These sample tiles had the melamine formaldehyde resin impregnated kraft paper backing. The average in inches for the 30 samples was as follows:

|                       | FROST   | SANDRIFT | GLACIER |
|-----------------------|---------|----------|---------|
| 70° F./50% RH         | 0.082   | 0.072    | 0.088   |
| 90° F./90% RH         | 0.079   | 0.064    | 0.088   |
| 75° F./10% RH         | 0.045   | 0.015    | 0.043   |
| 70° F./50% RH Cycle 1 | 0.041   | 0.021    | 0.044   |
| 90° F./90% RH         | 0.027   | 0.021    | 0.040   |
| 75° F./110% RH        | (0.007) | (0.007)  | (0.006) |
| 70° F./50% RH Cycle 2 | (0.003) | (0.005)  | 0.001   |
| 90° F./90% RH         | (0.012) | (0.015)  | (0.048) |
| 75° F./10% RH         | (0.055) | (0.051)  | (0.091) |
| 70° F./50% RH Cycle 3 | (0.043) | (0.039)  | (0.076) |

Whereas the average of the 30 sample tiles for each pattern somewhat exceeded the +/(−) 0.06 inches criteria in the initial position, there was no water applied to the resin impregnated paper backing in the manufacture of these tiles. At the completion of the 3 cycle test, the average of the FROST, GLACIER and SANDRIFT patterns was within the final position being within 0.125 inches from the flat plane criteria.

EXAMPLE 2

Two control samples made by standard manufacturing procedures and having a laminated aluminum foil/kraft paper backing (with the paper in contact with the core) were evaluated for final position from the flat plane in the 3 cycle sag test. Control No. 1 is the average for 3 tiles and Control No. 2 is the average of 4 tiles. The results were as follows:

|                       | Control No. 1 | Control No. 2 |
|-----------------------|---------------|---------------|
| 70° F./50% RH         | 0.036 in.     | 0.001 in.     |
| 90° F./90% RH         | (0.007)       | (0.086)       |
| 75° F./10% RH         | (0.102)       | (0.057)       |
| 70° F./50% RH Cycle 1 | (0.118)       | (0.102)       |
| 90° F./90% RH         | (0.179)       | (0.152)       |
| 75° F./10% RH         | (0.171)       | (0.113)       |
| 70° F./50% RH Cycle 2 | (0.196)       | (0.154)       |
| 90° F./90% RH         | (0.263)       | (0.218)       |
| 75° F./10% RH         | (0.262)       | (0.185)       |
| 70° F./50% RH         | (0.290)       | (0.233)       |

Neither of these control tiles passed the final position criteria of 0.125 inches from the flat plane.

EXAMPLE 3

Two samples with 3 tiles in each sample were tested for their average position relative to the flat plane while undergoing the 3 cycle sag test recited above. It should be noted that in these tests, the high temperature and humidity conditions were increased to 104° F. and 90% relative humidity instead of 90° F./90% RH. In addition, in the manufacture of the tiles, water was sprayed on the melamine formaldehyde resin impregnated paper backing prior to machining and painting the tiles. The tiles were made with a standard mineral wool and starch gel binder formulation. The 3 tile average for each sample was as follows:

|                       | No. 1   | No. 2   |
|-----------------------|---------|---------|
| 70° F./50% RH         | 0.023   | 0.032   |
| 104° F./90% RH        | (0.038) | (0.020) |
| 75° F./10% RH         | (0.091) | (0.056) |
| 70° F./50% RH Cycle 1 | (0.092) | (0.045) |
| 104° F./90% RH        | (0.060) | (0.033) |
| 75° F./10% RH         | (0.094) | (0.074) |
| 70° F./50% RH Cycle 2 | (0.101) | (0.051) |
| 104° F./10% RH        | (0.087) | (0.042) |
| 75° F./10% RH         | (0.132) | (0.083) |
| 70° F./50% RH Cycle 3 | (0.116) | (0.057) |

These tiles had slight cupping but met the +/(−) 0.06 inches initial flat plane criteria, and the final position for the tiles was less than 0.125 inches from the flat plane.

EXAMPLE 4

In this example, a surface burning characteristics test was conducted on melamine formaldehyde impregnated paper backed cast acoustical tiles. These tiles were made at the same time as the tiles in Example 3 wherein water was sprayed on the formaldehyde resin impregnated paper backing prior to machining and painting the tiles.

The samples consisted of 12 nominal 2 feet×2 feet acoustical tiles with the melamine formaldehyde resin kraft paper on the back surface, which were butt-jointed together. A 1 foot long×22 inches wide x 1/16 inch thick uncoated steel plate was placed at the fire end of the furnace "upstream" from the gas burners to complete the 25 foot sample length. The test samples were pre-conditioned at a temperature of 73°±4° F. and a relative humidity of 50±5% prior to testing. In the test, the resin impregnated kraft paper back surface was exposed to the flame.

The test was conducted in accordance with UL Standard 723 (ASTM E 84) "Test for Surface Burning Characteristics of Building Materials." The test determines the flame spread and smoke developed indices when exposed to fire. The maximum distance the flame spreads along the length of the sample from the end of the igniting flame is determined by observation. The flame spread index is derived by plotting the progression of the flame front on a time-distance scale and then using a formula calculation to determine the index. The smoke developed during the test is indicated by the output of a photoelectric circuit operating across the furnace flue pipe and calculating the index by comparing the area under the light absorption vs. time curve to the area under the curve for untreated red oak.

Two tests were run with the following results:

| Test No. | Flame Spread | Smoke Developed |
|----------|--------------|-----------------|
| 1        | 19.8         | 1.7             |
| 2        | 14.7         | 4.4             |

Based on these test results, the melamine formaldehyde impregnated paper backed cast acoustical tiles were classified as follows:

| Flame Spread    | 25    |
|-----------------|-------|
| Smoke Developed | 0–15  |

Having completely described this invention what is claimed is:

1. A cast, acoustical ceiling tile having a mineral wool core and a starch binder and which has a formaldehyde resin impregnated paper backing, said paper containing at least about 30% by weight of the formaldehyde resin, which provides the tile with improved sag resistance in high temperature, high humidity conditions.

2. The acoustical tile of claim 1 in which the formaldehyde resin is selected from a melamine formaldehyde resin, a phenol formaldehyde resin, and a urea formaldehyde resin.

3. The acoustical tile of claim 1 in which the formaldehyde resin is a melamine formaldehyde resin.

4. The acoustical tile of claim 3 in which the melamine formaldehyde resin ranges between about 30% and about 50% by weight of the resin impregnated paper.

5. The acoustical tile of claim 3 in which the paper backing is kraft paper having a basis weight ranging from about 25 to about 50 pounds per 3,000 square feet.

6. The acoustical tile of claim 4 in which the melamine formaldehyde resin ranges between about 36 and about 40% by weight of the resin impregnated paper.

7. The acoustical tile of claim 6 in which the paper backing is kraft paper having a basis weight of about 40 pounds per 3,000 square feet.

* * * * *